United States Patent
Vander Lind et al.

(10) Patent No.: US 9,664,175 B2
(45) Date of Patent: May 30, 2017

(54) CARBON FIBER MOTOR ROTOR INTEGRATING PROPELLER MOUNT

(71) Applicant: X Development LLC, Mountain View, CA (US)

(72) Inventors: Damon Vander Lind, Alameda, CA (US); George Edward Homsy, San Rafael, CA (US)

(73) Assignee: X Development LLC, Mountain View, CA (US)

( * ) Notice: Subject to any disclaimer, the term of this patent is extended or adjusted under 35 U.S.C. 154(b) by 294 days.

(21) Appl. No.: 14/474,105

(22) Filed: Aug. 30, 2014

(65) Prior Publication Data

US 2016/0061186 A1 Mar. 3, 2016

(51) Int. Cl.
*F03D 1/06* (2006.01)
*F03D 5/00* (2006.01)

(52) U.S. Cl.
CPC ............ *F03D 1/0666* (2013.01); *F03D 5/00* (2013.01); *F05B 2240/921* (2013.01); *Y02E 10/70* (2013.01); *Y02E 10/721* (2013.01)

(58) Field of Classification Search
CPC ........ F03D 1/0666; F03D 1/0691; F03D 9/32; F05B 2240/921; F05B 2240/923; B64C 39/022; B64C 2201/108
USPC ......................................................... 416/84
See application file for complete search history.

(56) References Cited

U.S. PATENT DOCUMENTS

| | | |
|---|---|---|
| 4,251,040 A | 2/1981 | Loyd |
| 4,332,525 A | 6/1982 | Cheney, Jr. |
| 8,485,464 B2 | 7/2013 | Kroo |
| 8,664,792 B2 * | 3/2014 | Rebsdorf ............. B29C 53/585 290/55 |
| 2008/0069696 A1 * | 3/2008 | Ball ...................... F03D 1/0666 416/132 B |
| 2010/0013226 A1 * | 1/2010 | Blumer ..................... B64B 1/50 290/44 |
| 2010/0018344 A1 | 1/2010 | Spears et al. |
| 2010/0194115 A1 | 8/2010 | Jakubowski et al. |
| 2010/0266414 A1 * | 10/2010 | Miller ................... F03D 1/0608 416/223 R |
| 2012/0104763 A1 | 5/2012 | Lind |

(Continued)

FOREIGN PATENT DOCUMENTS

DE   EP 2363601 A2 *  9/2011  .......... F03D 1/0658

OTHER PUBLICATIONS

International Searching Authority, International Search Report and Written Opinion mailed on Oct. 29, 2015, issued in connection with International Application No. PCT/US2015/046237, filed on Aug. 21, 2015, 9 pages.

*Primary Examiner* — Marina Tietjen
(74) *Attorney, Agent, or Firm* — McDonnell Boehnen Hulbert & Berghoff LLP.

(57) ABSTRACT

A rotor for use with an airborne wind turbine, wherein the rotor comprises a front flange, a can, a rear flange, and a rigid insert comprising a propeller mount, wherein the front flange, can, and rear flange comprise one of carbon fiber and spun aluminum, wherein a rear end of the front flange is attached to a front end of the can, and the rear flange is mounted to a rear end of the can, wherein the rigid insert is bonded to the front flange; and wherein the rigid insert comprises a tube that axially extends within the rotor to allow for the positioning of a driveshaft therethrough.

21 Claims, 7 Drawing Sheets

(56) References Cited

U.S. PATENT DOCUMENTS

2013/0221154 A1 8/2013 Vander Lind et al.
2013/0336775 A1 12/2013 Blake et al.
2014/0154077 A1 6/2014 Castell Martinez et al.

* cited by examiner

CARBON FIBER MOTOR ROTOR INTEGRATING PROPELLER MOUNT

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an Airborne Wind Turbine (AWT).

SUMMARY

A rotor that may be used on an airborne wind turbine that is operable in both a power generating mode and in a thrust generating mode, wherein the rotor serves as a mount for the propeller of the wind turbine, and is advantageously constructed of a front flange, a can, a rear flange that are each made of carbon fiber or spun aluminum with a rigid insert positioned with the front flange that interfaces with the propeller, wherein the rotor design provides a lightweight rotor having sufficient strength to serve as rotor operable in both power generating mode and in thrust generating mode, and also to serve as a propeller mount.

An airborne wind turbine system including an aerial vehicle having a main wing, an electrically conductive tether having a first end secured to the main wing of the aerial vehicle and a second end secured to a ground station, a plurality of power generating turbines connected to the main wing wherein at least one of the power generating turbines are operable in a power generation mode and in a thrust generation mode, and includes a propeller mounted to a rotor, wherein the rotor includes a front flange, a can, a rear flange, and a rigid insert comprising a propeller mount, wherein the front flange, can, and rear flange comprise one of carbon fiber and spun aluminum, wherein a rear end of the front flange is attached to a front end of the can, and the rear flange is mounted to a rear end of the can, wherein the rigid insert is bonded to the front flange, and wherein the rigid insert comprises a tube that axially extends within the rotor to allow for the positioning of a driveshaft therethrough.

In another aspect, a rotor is provided for use with an airborne wind turbine system wherein the rotor comprises a front flange, a can, a rear flange, and a rigid insert comprising a propeller mount, wherein the front flange, can, and rear flange comprise one of carbon fiber or spun aluminum, wherein a rear end of the front flange is attached to a front end of the can, and the rear flange is mounted to a rear end of the can, wherein the rigid insert is bonded to the front flange; and wherein the rigid insert comprises a tube that axially extends within the rotor to allow for the positioning of a driveshaft therethrough In another aspect, a means for providing rotor with an integrated propeller mount is provided.

These as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. OVERVIEW

Example embodiments relate to aerial vehicles, which may be used in a wind energy system, such as an Airborne Wind Turbine (AWT). In particular, illustrative embodiments may relate to or take the form of methods and systems using an airborne vehicle that is attached to a ground station using an electrically conductive tether.

Wind energy systems, such as an AWT, may be used to convert wind energy to electrical energy. An AWT is a wind based energy generation device that may include an aerial vehicle constructed of a rigid wing with mounted turbines. The aerial vehicle may be operable to fly in a path across the wind, such as a substantially circular path above the ground (or water) to convert kinetic wind energy to electrical energy. In such cross wind flight, the aerial vehicle flies across the wind in a circular pattern similar to the tip of a wind turbine. The rotors attached to the rigid wing may be used to generate power by slowing the wing down. In particular, air moving across the turbine blades may force the blades to rotate, driving a generator to produce electricity. The aerial vehicle may also be connected to a ground station via an electrically conductive tether that transmits power generated by the aerial vehicle to the ground station, and on to the grid.

When it is desired to land the aerial vehicle, the electrically conductive tether is wound onto a spool or drum in the ground station and the aerial vehicle is reeled in towards a perch on the ground station. Prior to landing on the perch, the aerial vehicle transitions from a flying mode to a hover mode. The drum is further rotated to further wind the tether onto the drum until the aerial vehicle comes to rest on the perch.

As noted above, a plurality of mounted turbines may be secured to the main wing and may be used to generate electricity in power generation mode, or provide thrust in hover mode or in a powered flying mode of operation. The turbines include propellers having a plurality of turbine blades that are secured to the rotor, or rotating portion of the turbine which is in turn secured to a rotating shaft, that in power generation mode is used to drive the generator to produce energy.

When the turbine blades on the propeller are rotated during thrust generating mode or powered flying mode, the turbine is connected to a motor/generator having a rotor and stator. The factors that drive motor torque have primarily to do with the fineness and diameter of the motor design. A thin and large diameter stator and rotor will produce the most torque, but have the drawback of requiring a significant amount of structural rigidity and strength to hold a consistent gap width between the electrical rotor and electrical stator, or to hold sufficient roundness.

There are different ways to approach this problem. For example, in-runner and out-runner motors may be built. Axial or transverse flux machines also offer other advantages for simplicity of structure. In each case, the common problem tends to be that the material which is being used to hold the rotor and whatever the motor is driving (e.g., a propeller) is often sparse or thin, and thus either needs to be extremely thin and not very stiff (i.e. steel), or made of a material with poor fatigue properties (i.e. aluminum). Further the electrical rotor (magnets and back-iron) are often supported by separate bearings from the load to be propelled, in this case a propeller. While convenient for the sake of compartmentalization, the use of separate bearings results in a significantly heavier and more complex system.

An aluminum casting could be used for the rotor which includes a propeller mount. However, the fatigue properties of aluminum are poor, thereby requiring a larger structure to accommodate fatigue resulting from the gyroscopic loads experienced by the rotor during operation of the AWT. An equivalent rotor design where the rotor is made of an aluminum casting would weigh around 4 kilograms, a heavy component for a rotating rotor used on an AWT where excess weight is undesirable. Furthermore, a rotor made from a casting has other drawbacks as well including porosity, the possibility of voids in the casting, and susceptibility to cracking. As a result, it would be desirable to provide a rotating motor rotor that serves as a propeller mount on the AWT that provides improvements over an aluminum casting rotor design.

In an example embodiment, an aerial vehicle is provided having a plurality of turbines mounted to vertically extending pylons on the main wing. Each turbine includes a rotor that may also serve as a mount for the propeller, which has a plurality of turbine blades. In alternate embodiments, the propeller may attach by clips or bolts at the diameter of the rotor. The present embodiments advantageously include a rotor constructed of a number of carbon fiber components that may be used in place of the aluminum casting of the prior design, and that may be used as a mount for the propeller. Alternately, the components could be formed of spun aluminum.

In an exemplary embodiment, the rotor is comprised of three primary elements that are constructed from carbon fiber. The three primary elements include a front flange, a central cylindrical can or shell, and a rear flange which are each made of carbon fiber. The design advantageously creates an open space by joining together the two flanges at the bearing so that there is a hollow space. Gussets are not required providing for an improvement in fatigue properties.

In operation, the rotor is a hollow member that may have permanent magnets mounted to inside of the periphery of the central can or shell. A stationary stator may be positioned within the central shell having coils and power electronics that cooperate with the permanent magnets to rotate the rotor.

The propeller of the turbine may be mounted to the front flange of the rotor. It should be noted that the front surface of the front flange may be shaped to closely match the shape of the propeller root, removing the need for any substantive metal fixture to mount the propeller. Such a mounting also conveys the torque directly from the propeller to the electromagnetic rotor, and thus may avoid putting any torque through the central driveshaft which is secured to the rotor. An alternate design could be used to attach the propeller at the diameter of the rotor which could allow for the use of smaller bolts.

The front flange may be advantageously bonded to the central can or shell at the time of assembly, while the rear flange may be bolted onto the can or shell, such that the rotor may still be removed from the stator. The rear flange attachment has the added advantage of both stiffening the central can or shell, and allowing an interface which further stiffens the shell through attachment to the rear flange. A number of bolts or clamping elements may be used around the rim of the can or shell to attach the rear flange. The mold surface of the front flange points forward so as to have a clean interface for attachment to the propeller. All three carbon fiber parts may be easily made through autoclave, bladder molding, vacuum bagging, infusion, or other single side production methods.

A metal insert may be placed in the front flange, which may be a cast insert that is used to stiffen the joint between the front flange at the area where it mates to the propeller. In alternate designs, the metal insert might be replaced with a foam or low density wood insert, or might be replaced with another carbon fiber element that resolves the out of plane stresses occurring between the mounting face of the propeller, and the remainder of the front flange. The front flange is bonded to the central can or shell which blends to a cylindrical cross section. The front flange may be bonded to the central shell in the area of this blend.

A main steel driveshaft may be bonded to, or press fit into, the can or shell, which provides the most accurate reference of the shell to the shaft and thus minimizes error in the gap on the electromagnetic device, i.e., the gap between the permanent magnets on the rotor and the coils on the stator. The steel shaft may be tapered downwardly as it extends towards the rear flange so that the rear bearing and rear part of the shaft are no heavier than needed, while the front bearing and shaft may be sufficiently large to resolve both the bending and side force generated by the combination of propeller and motor. The bearings may be tapered roller bearings but may also be cup-and-cone style bearings, or deep groove cartridge ball bearings, or spherical roller bearings.

A main driveshaft may be constructed of steel primarily to avoid high bearing mass. Because long life bearings do not have large diameters, a steel material is desirable which handles high mohr stress, has good fatigue resistance, which is compact, and which can be shaped with high fidelity to meet the tolerances of a set of bearings. Because long life bearings tend to have large rolling elements they are either quite heavy or have relatively small inner diameters. Steel allows all of these constraints to be met, while keeping the bearing diameter small and thus allowing long life bearings. However, a carbon fiber shaft could also be used, or titanium or other materials could be used for the shaft. In the exemplary embodiment, steel is used as it is quite practical to work with.

The carbon fiber rotor design described above advantageously provides a rotor with superior fatigue properties compared to an aluminum casting rotor design. In addition, the carbon fiber rotor design only weighs 800 grams, providing significant weight reduction advantages, particularly when considering AWT designs, where 8 or more such rotors may be used. As a result, a weight reduction of over 25 kilograms may be achieved using the carbon fiber rotor design described above.

2. ILLUSTRATIVE AIRBORNE WIND TURBINES

Figure 1:
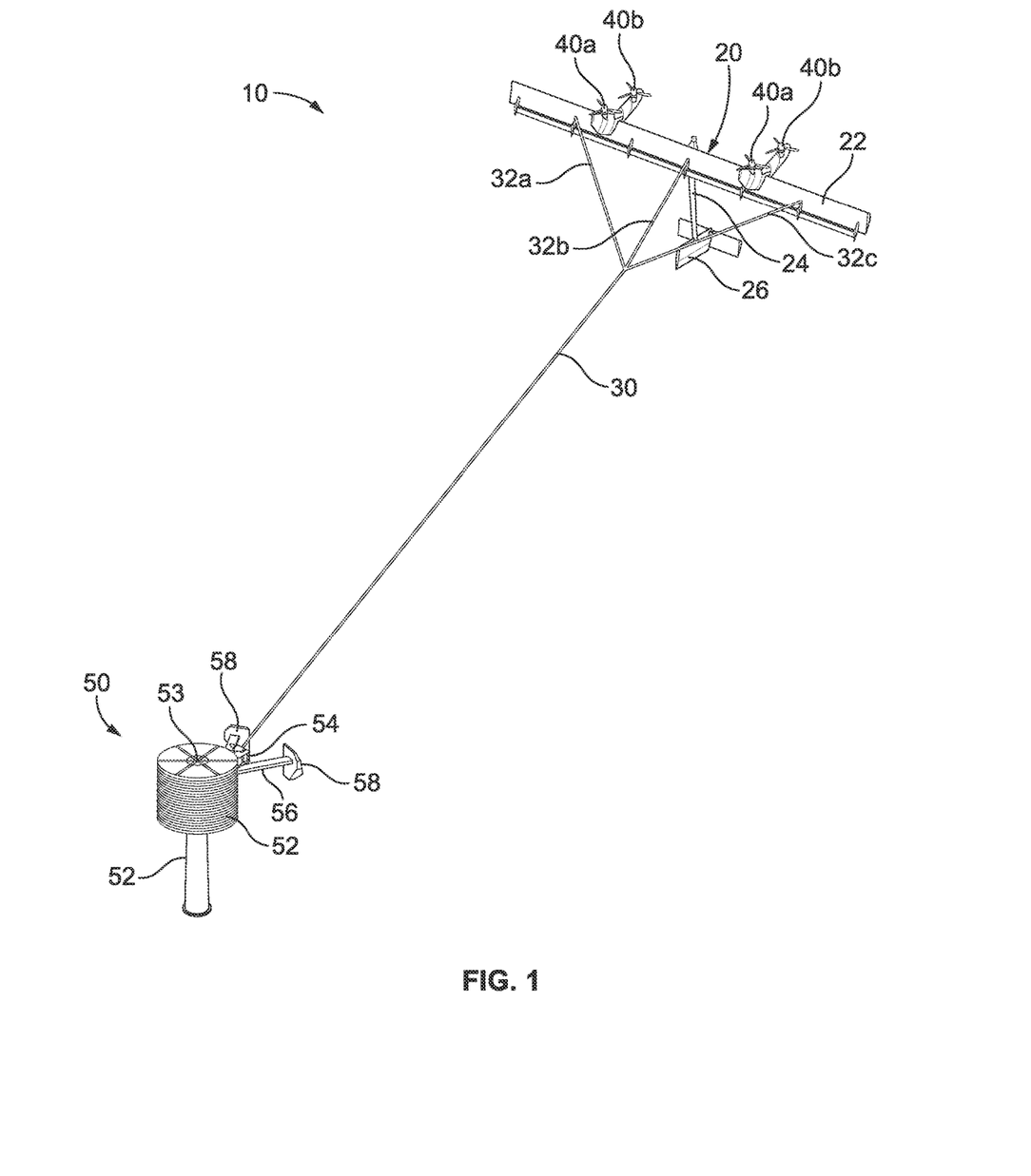
FIG. 1 is a perspective view of an airborne wind turbine 10 including aerial vehicle 20 attached to a ground station 50 with an electrically conductive tether 30, according to an example embodiment.
Figure 2:
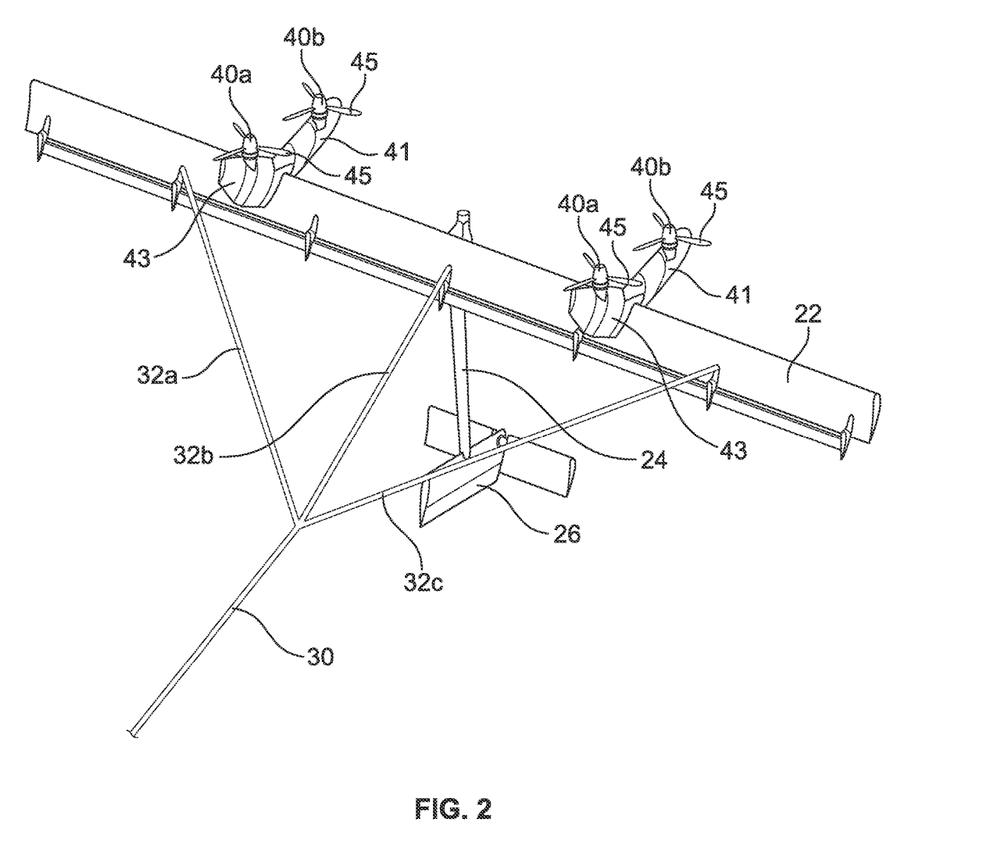
FIG. 2 is a close-up perspective view of aerial vehicle 20 shown in FIG. 1.

As disclosed in FIGS. 1-2, an airborne wind turbine (AWT) 10 is disclosed, according to an example embodiment. AWT 10 is a wind based energy generation device that includes an aerial vehicle 20 constructed of a rigid wing 22 with mounted turbines 40 that flies in a path, such as a substantially circular path, across the wind. In an example embodiment, the aerial vehicle may fly between 250 and 600 meters above the ground (or water) to convert kinetic wind energy to electrical energy. However, an aerial vehicle may fly at other heights without departing from the scope of the invention. In the cross wind flight, the aerial vehicle 20 flies across the wind in a circular pattern similar to the tip of a wind turbine. The rotors 40 attached to the rigid wing 22 are used to generate power by slowing the wing 22 down. Air moving across the turbine blades forces them to rotate, driving a generator to produce electricity. The aerial vehicle 20 is connected to a ground station 50 via an electrically conductive tether 30 that transmits power generated by the aerial vehicle to the ground station 50, and on to the grid.

As shown in FIG. 1, the aerial vehicle 20 may be connected to the tether 30, and the tether 30 may be connected to the ground station 50. In this example, the tether 30 may be attached to the ground station 50 at one location on the ground station 50, and attached to the aerial vehicle 20 at three locations on the aerial vehicle 2 using bridle 32a, 32b, and 32c. However, in other examples, the tether 30 may be attached at multiple locations to any part of the ground station 50 and/or the aerial vehicle 20.

The ground station 50 may be used to hold and/or support the aerial vehicle 20 until it is in an operational mode. The ground station may include a tower 52 that may be on the order of 15 meters tall. The ground station may also include a drum 52 rotatable about drum axis 53 that is used to reel in aerial vehicle 20 by winding the tether 30 onto the rotatable drum 52. In this example, the drum 52 is oriented vertically, although the drum may also be oriented horizontally (or at an angle). Further, the ground station 50 may be further configured to receive the aerial vehicle 20 during a landing. For example, support members 56 are attached to perch panels 58 that extend from the ground station 50. When the tether 30 is wound onto drum 52 and the aerial vehicle 20 is reeled in towards the ground station 50, the aerial vehicle may come to rest upon perch panels 58. The ground station 50 may be formed of any material that can suitably keep the aerial vehicle 20 attached and/or anchored to the ground while in hover flight, forward flight, or crosswind flight. In some implementations, ground station 50 may be configured for use on land. However, ground station 50 may also be implemented on a body of water, such as a lake, river, sea, or ocean. For example, a ground station could include or be arranged on a floating off-shore platform or a boat, among other possibilities. Further, ground station 50 may be configured to remain stationary or to move relative to the ground or the surface of a body of water.

The tether 30 may transmit electrical energy generated by the aerial vehicle 20 to the ground station 50. In addition, the tether 30 may transmit electricity to the aerial vehicle 20 in order to power the aerial vehicle 20 during takeoff, landing, hover flight, and/or forward flight. The tether 30 may be constructed in any form and using any material which may allow for the transmission, delivery, and/or harnessing of electrical energy generated by the aerial vehicle 20 and/or transmission of electricity to the aerial vehicle 20. The tether 30 may also be configured to withstand one or more forces of the aerial vehicle 20 when the aerial vehicle 20 is in an operational mode. For example, the tether 30 may include a core configured to withstand one or more forces of the aerial vehicle 20 when the aerial vehicle 20 is in hover flight, forward flight, and/or crosswind flight. The core may be constructed of any high strength fibers or a carbon fiber rod. In some examples, the tether 30 may have a fixed length and/or a variable length. For example, in one example, the tether has a fixed length of 500 meters.

The aerial vehicle 20 may include or take the form of various types of devices, such as a kite, a helicopter, a wing and/or an airplane, among other possibilities. The aerial vehicle 20 may be formed of solid structures of metal, plastic and/or other polymers. The aerial vehicle 20 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 1, and in greater detail in FIG. 2, the aerial vehicle 20 may include a main wing 22, rotors 40a and 40b, tail boom or fuselage 24, and tail wing 26. Any of these components may be shaped in any form which allows for the use of components of lift to resist gravity and/or move the aerial vehicle 20 forward.

The main wing 22 may provide a primary lift for the aerial vehicle 20. The main wing 22 may be one or more rigid or flexible airfoils, and may include various control surfaces, such as winglets, flaps, rudders, elevators, etc. The control surfaces may be used to stabilize the aerial vehicle 20 and/or reduce drag on the aerial vehicle 20 during hover flight, forward flight, and/or crosswind flight. The main wing 22 may be any suitable material for the aerial vehicle 20 to engage in hover flight, forward flight, and/or crosswind flight. For example, the main wing 20 may include carbon fiber and/or e-glass.

Rotor connectors 43 may be used to connect the upper rotors 40a to the main wing 22, and rotor connectors 41 may be used to connect the lower rotors 40b to the main wing 22. In some examples, the rotor connectors 43 and 41 may take the form of or be similar in form to one or more pylons. In this example, the rotor connectors 43 and 41 are arranged such that the upper rotors 40a are positioned above the wing 22 and the lower rotors 40b are positioned below the wing 22.

The rotors 40a and 40b may be configured to drive one or more generators for the purpose of generating electrical energy. In this example, the rotors 40a and 40b may each include one or more blades 45, such as three blades. The one or more rotor blades 45 may rotate via interactions with the wind and which could be used to drive the one or more generators. In addition, the rotors 40a and 40b may also be configured to provide a thrust to the aerial vehicle 20 during flight. With this arrangement, the rotors 40a and 40b may function as one or more propulsion units, such as a propeller. Although the rotors 40a and 40b are depicted as four rotors in this example, in other examples the aerial vehicle 20 may include any number of rotors, such as less than four rotors or more than four rotors, e.g. six or eight rotors.

Referring back to FIG. 1, when it is desired to land the aerial vehicle 20, the drum 52 is rotated to reel in the aerial vehicle 20 towards the perch panels 58 on the ground station 50, and the electrically conductive tether 30 is wound onto drum 52. Prior to landing on the perch panels 58, the aerial vehicle 20 transitions from a flying mode to a hover mode. The drum 52 is further rotated to further wind the tether 30 onto the drum 52 until the aerial vehicle 20 comes to rest on the perch panels 58.

Figure 3:
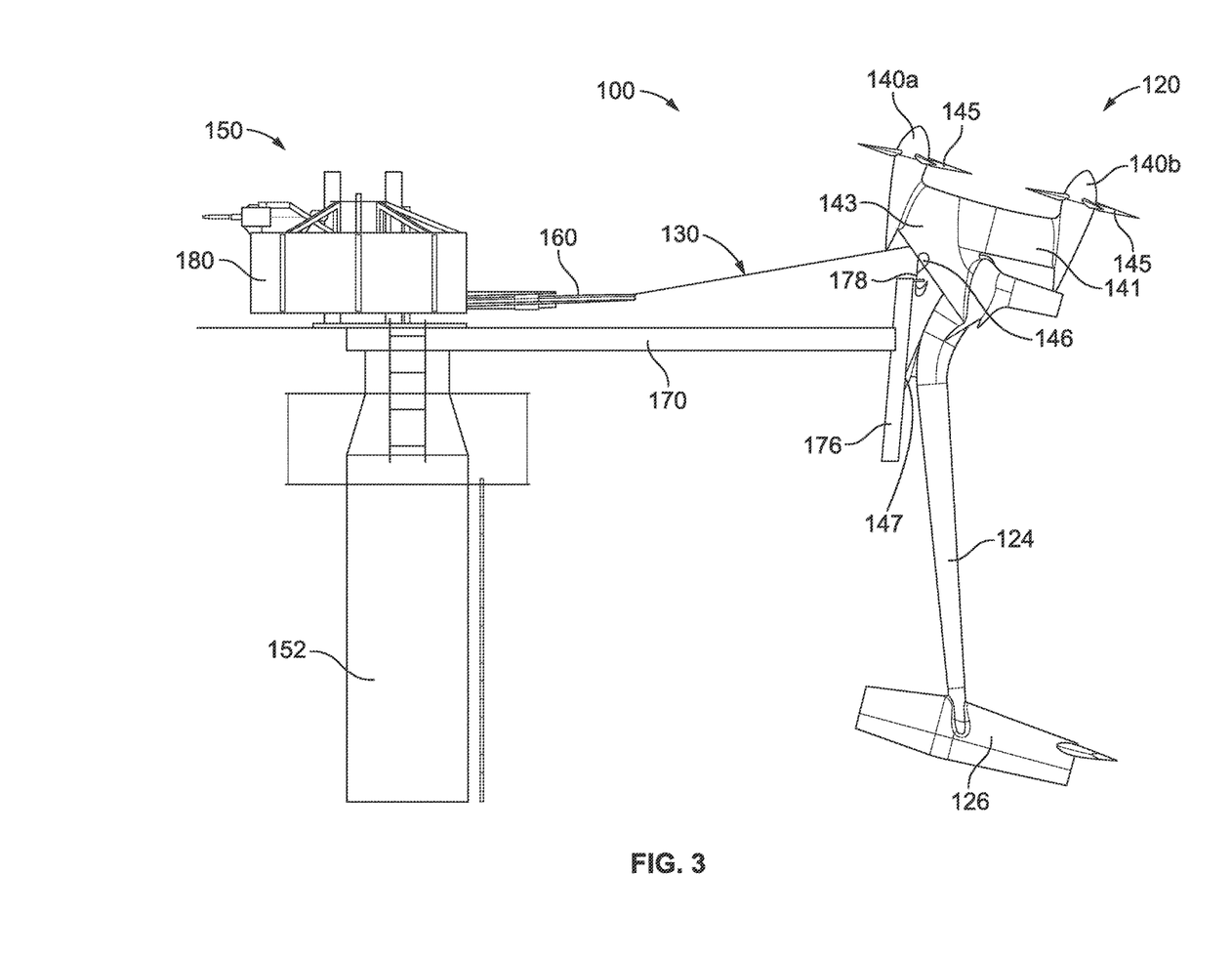
FIG. 3 is a side view of aerial vehicle 120 perched on perch panel 160 attached to ground station 150, according to an example embodiment.
Figure 4:
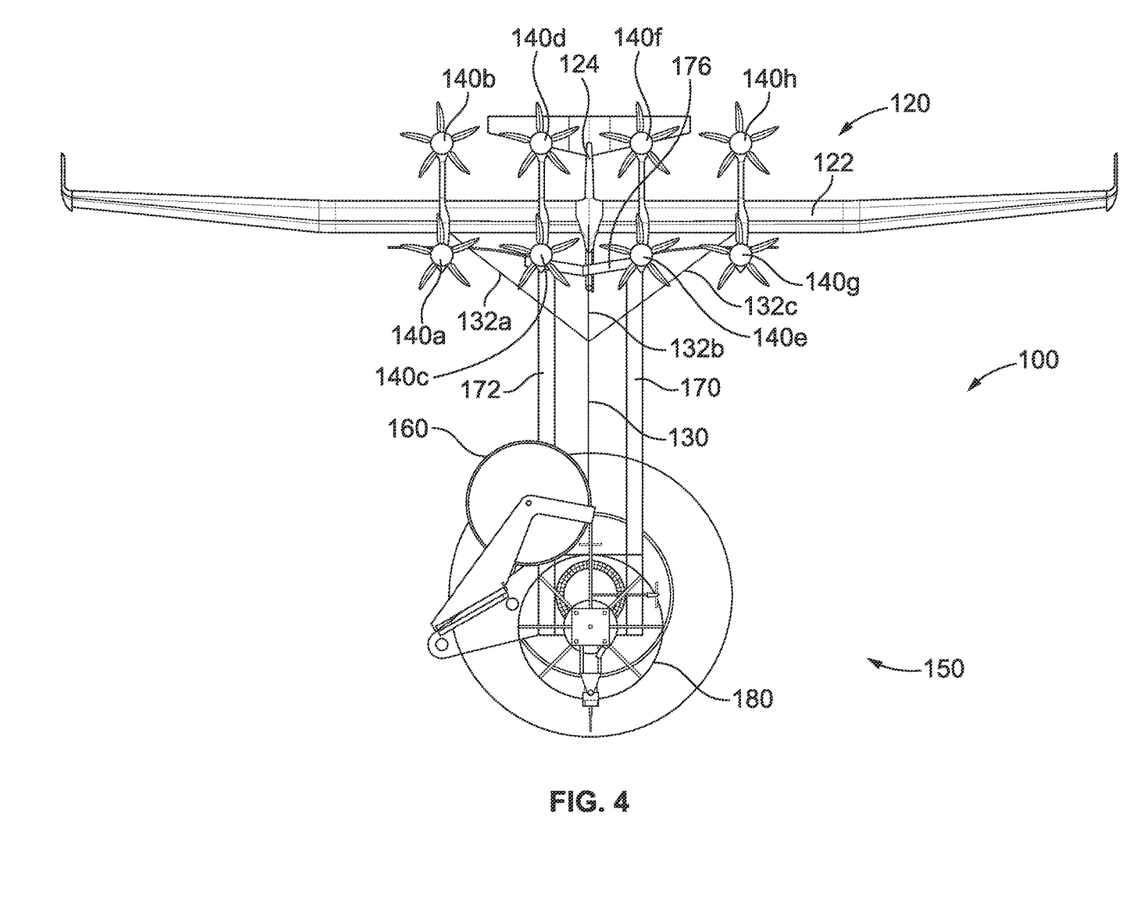
FIG. 4 is a top view of the aerial vehicle 120 and ground station 150 shown in FIG. 3, according to an example embodiment.

FIG. 3 is a side view of an airborne wind turbine including aerial vehicle 120 perched on perch panel 176 attached to ground station 150, and FIG. 4 is a top view of the aerial vehicle 120 and ground station 150 shown in FIG. 3, according to an example embodiment. In FIGS. 3 and 4, ground station 150 includes a tower 152 upon which rotatable drum 180 is positioned, with perch panel extensions 170 and 172 extending outwardly and attached to perch panel 176. In an embodiment, the tower 152 may be 15 meters in height. An electrically conductive tether 130 extends from the levelwind 160 and is attached to wing 122 of aerial vehicle 120 using bridle lines 132a, 132b, and 132c. In one embodiment the bridle lines 132a, 132b, and 132c may be attached at asymmetric locations along the span of the wing 122, such that the inboard side of wing 122 has the bridle attached further from the wingtip, and the outboard side of the wing 122 has the bridle attached closer to the outboard wingtip. Such an asymmetric configuration allows the bridle lines 132a and 132c to better clear a larger sized perch panel.

Aerial vehicle 120 includes lower rotors 140a, 140c, 140e, and 140g mounted on lower pylons 143 attached to wing 122 and upper rotors 140b, 140d, 140f, and 140g mounted on upper pylons 143 attached to wing having propellers 145. In an embodiment, wing 122 is 4 meters long and includes fuselage 124 and rear elevator mount 126.

3. EXAMPLE EMBODIMENT OF CARBON FIBER ROTOR WITH INTEGRATED PROPELLER MOUNT

Figure 5:
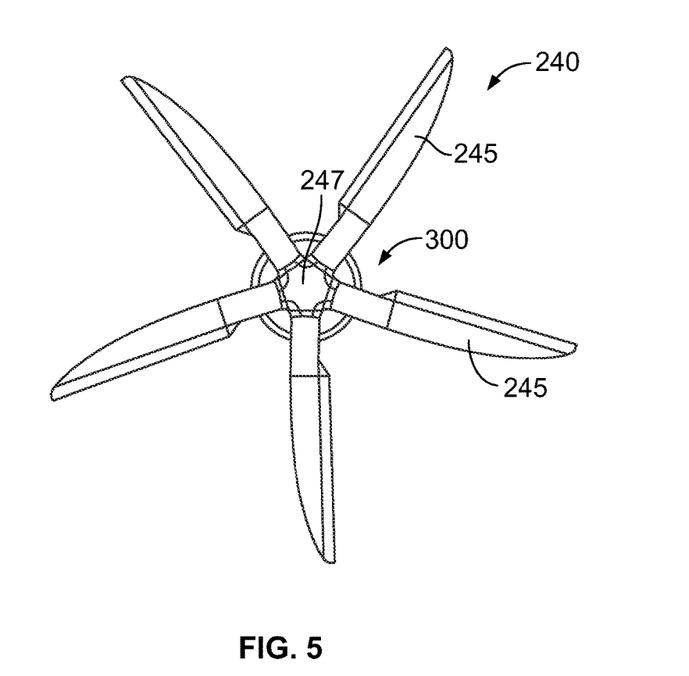
FIG. 5 is a front view of airborne wind turbine assembly 240 including a propeller 247 attached to a rotor 300, according to an example embodiment.
Figure 6:
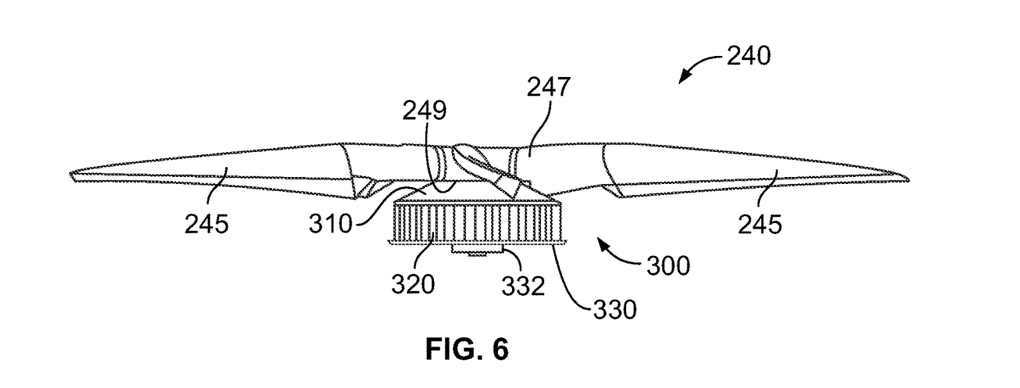
FIG. 6 is a top view of the wind turbine assembly 240 shown in FIG. 5.

FIGS. 5-10 illustrated an example embodiment of a carbon fiber rotor having an integrated propeller mount. In particular, FIG. 5 is a front view of airborne wind turbine assembly 240 having propeller 247 having turbine blades 245 mounted to rotor 300. FIG. 6 is a top view of airborne wind turbine assembly 240 showing the propeller 247 mounted to front flange 310 of rotor 300. Rotor 300 is positioned on the rear side of the propeller 247, and the rotor 300 includes front flange 310, central can or shell 320, and rear flange 330 having rearwardly extending circular locating flange 332.

Figure 7:
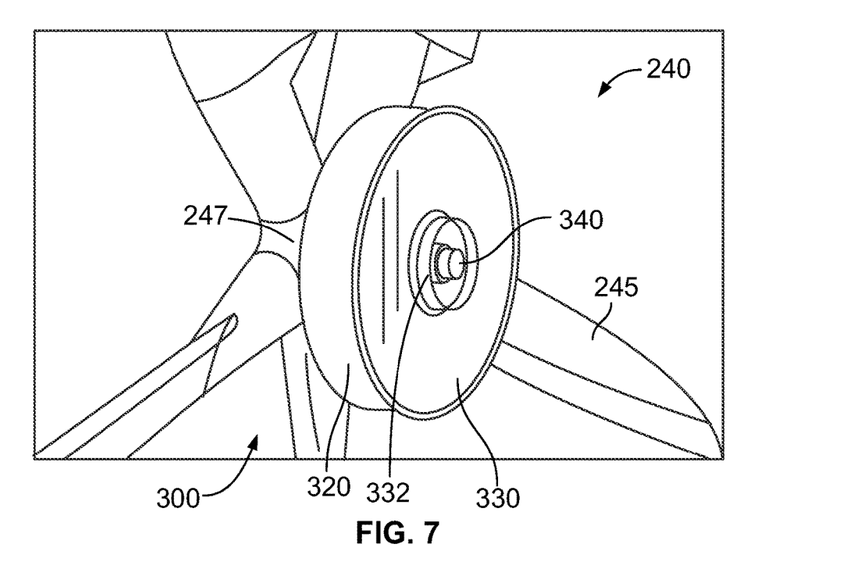
FIG. 7 is a close up rear perspective view of the wind turbine assembly 240 shown in FIGS. 5 and 6.
Figure 9:
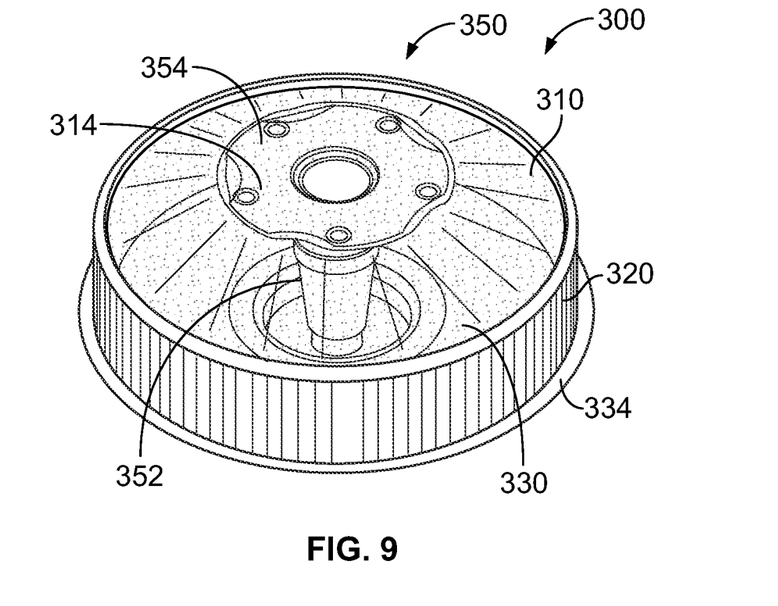
FIG. 9 is a front perspective view of rotor 300 shown in FIGS. 5-8, according to an example embodiment.
Figure 10:
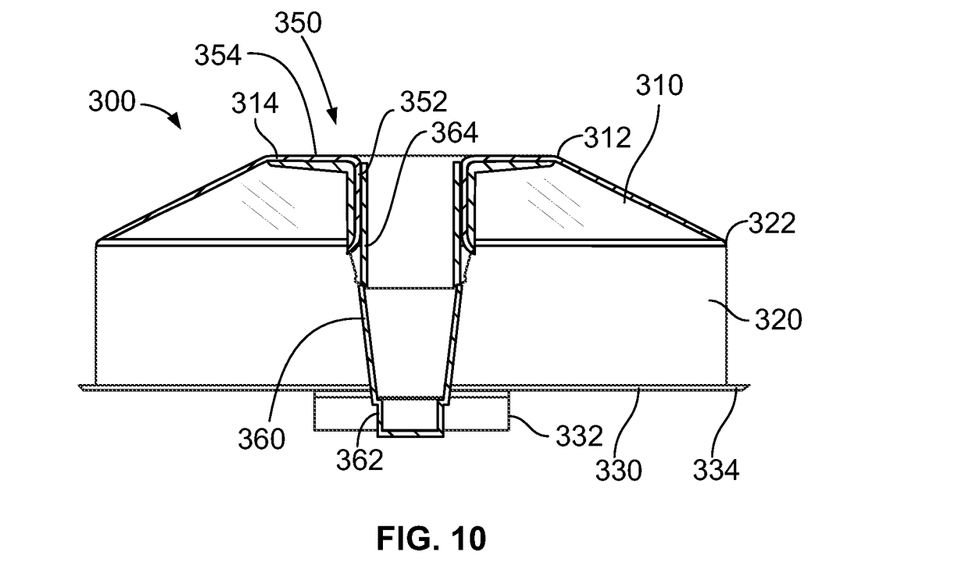
FIG. 10 is a cross-sectional view of rotor 300 shown in FIGS. 5-9, according to an example embodiment.

FIG. 7 is a close up rear perspective view of airborne wind turbine assembly 240 showing propeller 247 mounted to rotor 300, where rear flange 330 is shown attached to can or shell 320. A circular locating flange 332 is shown extending rearwardly from the rear flange 330 where it may sealingly engage a stator (not shown). A main driveshaft 340 is shown extending through the rear flange 330 and locating flange 332. As noted above, the propeller 247 is mounted to a front end of the carbon fiber rotor 300 where it is mounted to front flange 310 of the rotor 300, which is in turn bonded to the main driveshaft 340. As shown in FIGS. 9 and 10, the front flange 310 is also bonded to a metal insert 350 which distributes load.

Figure 8:
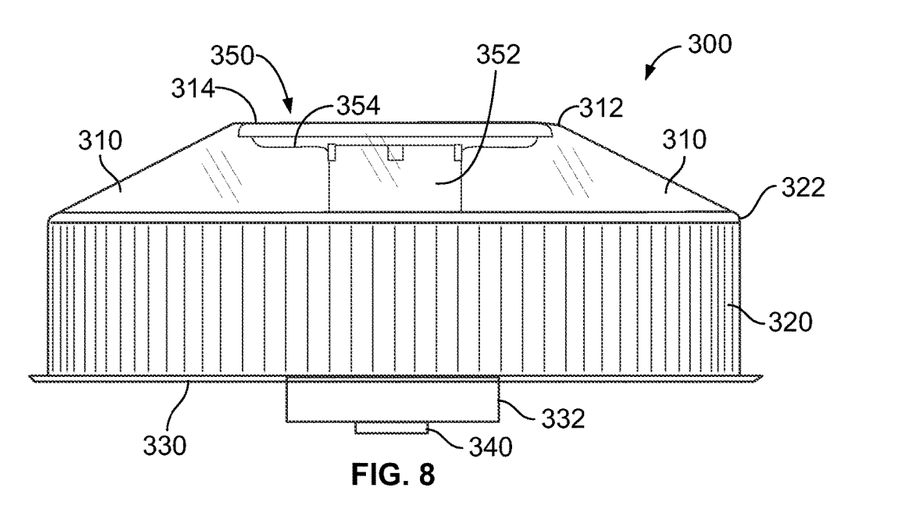
FIG. 8 is a top view of rotor 300 of wind turbine 240 shown in FIGS. 5-7, according to an example embodiment.

FIGS. 8-10 show details of the rotor 300 shown in FIGS. 5-7. FIG. 8 is a top view of rotor 300 shown in FIGS. 5-7, with front flange 310 shown as semi-transparent. Rotor 300 includes a metal insert 350 that may be a cast insert that is used to stiffen the joint between the front surface of front flange 310 and the interface with the root of propeller 247. Metal insert 350 may be bonded to the front flange 310 and may include a nut plate 354 that is used for mounting to the propeller 247, and a hollow cylindrical portion 352 that extends rearwardly from the front surface 314 of front flange and positioned about the main driveshaft 340 (shown in FIGS. 7 and 8) to provide increased strength and distribute load.

In alternate designs, the metal insert 350 might be replaced with a foam or low density wood insert, or might be replaced with another carbon fiber element that resolves the out of plane stresses occurring between the mounting face of the propeller, and the remaining conical section of the front flange 310 that extends from the front surface 314 of the front flange to the middle flange 322 of the central can or shell 320. The front flange 310 may be bonded to the can or shell 320 which blends to a cylindrical cross section, inside of which the motor rotor is bonded or press fit. The front flange 310 is bonded to the can or shell 320 in the area of this blend at middle flange 322 (discussed further below).

FIG. 9 is a perspective rear view of rotor 300, again with front flange 310 shown as semi-transparent. FIG. 10 is a cross-sectional view of rotor 300. Metal insert 350 is shown with nut plate 354 positioned in front face 314 of front flange 310, and with hollow cylindrical section 352 extending within rotor 300 towards rear flange 330. Rear flange 330 is mounted to the central can or shell 320, where a periphery 334 of rear flange 330 may extend beyond the diameter of central can or shell 320.

The main steel driveshaft 340 may be bonded to, or press fit into, the rotor along inner surfaces 364, 362, and 360 within the rotor, which provides the most accurate reference of the shell 320 to the shaft and thus minimizes error in the gap on the electromagnetic device, i.e., the gap between the permanent magnets on the rotor 300 and the coils on the stator. As shown here, the steel driveshaft 340 may be tapered downwardly to conform to surface 360 as it extends towards the rear flange 330 so that the rear bearing and rear part of the shaft are no heavier than needed, while the front bearing and shaft may be sufficiently large to resolve both the bending and side force generated by the combination of propeller and motor. The bearings (not shown) may be tapered roller bearings but may also be cup-and-cone style bearings, or deep groove cartridge ball bearings, or spherical roller bearings.

In an exemplary embodiment, the rotor 300 is comprised of three primary elements that are constructed from carbon fiber. The three primary elements include the front flange 310, a cylindrical central can or shell 320, and a rear flange 330 which are each made of carbon fiber. The front flange 310 may be bonded to the can 320 at the time of assembly, and the can 320 may include a middle flange 322 to provide a surface for bonding with the front flange 310.

The rear flange 330 may be bolted onto the can or shell 320, allowing the rotor to be removed from the stator (not shown). The attachment of the rear flange 330 to the can 320 provides the added advantage of both stiffening the can or shell 320, and allowing an interface which further stiffens the can or shell 320 through attachment to the rear flange 330. A number of bolts or clamping elements may be used around the rim of the can or shell 320 to attach the rear flange 330. The mold surface of the front flange 310 may point forward to provide a clean attachment to the root of the propeller 247. All three carbon fiber elements discussed above may be easily made through autoclave, bladder molding, vacuum bagging, infusion, or other single side production methods.

The main driveshaft may be constructed of steel primarily to avoid high bearing mass. Because long life bearings do not have large diameters, a material is required which handles high mohr stress, has good fatigue resistance, which is compact, and which can be shaped with high fidelity to meet the tolerances of a set of bearings. Because long life bearings tend to have large rolling elements they are either quite heavy or have relatively small inner diameters. The use of steel for the main driveshaft allows all of these constraints to be met, while keeping the bearing diameter small and thus allowing long life bearings.

Furthermore, the main driveshaft can be press fit in the normal way relative to the inner surfaces 364, 362, and 360, if desired. An appropriate driveshaft material may be 17-4 stainless steel, although there are other appropriate materials. In some embodiments, a titanium shaft might be used. When using titanium, it is more likely the shaft would not be tapered. As shown in the cross-sectional view shown in FIG. 10, when using a main shaft, the shaft 340 may be tapered to optimize stiffness relative to mass. In a titanium design, a constant cross section shaft might be more likely given availability of materials.

Referring back to FIG. 7, rotor 300 is shown mated together with propeller 247 in a flight configuration. Only the rotor 330 part of the motor is shown, showing the cylindrical central can or shell 320, the front flange 310 (facing away in this image), and the rear flange 330 (shown in the foreground in this image). The rotor comprise a front flange 310, can or shell 320, and rear flange 330 in order to have a sufficiently stiff structure between the steel driveshaft 340 to the electromagnetic rotor. In this embodiment, the rear flange 330 includes a rearwardly extending circular flange 332 positioned about the driveshaft 340 that is used to reduce the diameter of the rear seal, which seals the rear flange 330 against the stator (not shown), and thus reduce both the size and speed of the seal so as to increase its life while also reducing the required size of the stator, which might be of a cast material. Because the rotor 300 sees much higher fatigue stresses than the stator, the three parts of the rotor may be made of carbon-fiber-reinforced polymer ("CFRP"), which is both very stiff and very resistant to fatigue.

The present embodiments advantageously include a rotor 300 constructed of a number of carbon fiber components that may be used in place of the aluminum casting of the prior design, and that may be used as a mount for the propeller. In particular, the propeller 247 mounts to a carbon fiber front flange 310, which in turn is bonded to a main driveshaft 340 and a metal insert 350 which distributes load. It should be noted that the front surface 314 of the front flange 310 is shaped to closely match the propeller root, removing the need for any substantive metal fixture to mount the propeller 247. This also conveys the torque directly from the propeller 247 to the electromagnetic rotor 300, and thus helps to avoid putting any torque through the central driveshaft 340.

Referring back to the cross-sectional view shown in FIG. 10, the cylindrical can 320 and middle flange 322 attached thereto are made as a single part on an aluminum male mandrel. This allows the part to be demolded after construction. The front flange 310 may be bonded to the metal insert 350, and the front flange 310 also has a front surface 314 that conforms to the contours of the propeller shape. The features or divots around the bolt holes in the nut plate 354 may be used to transfer shear because carbon on carbon surfaces are relatively poor in both compression (in particular through-thickness) and shear load transfer (again, in particular through-thickness). The molded surface on the front flange 310 is the front surface 314, so that it can mate to the propeller 247 appropriately. Therefore, the non-mold surface of the front flange 310 may be bonded to the non-mold surface of the middle flange 322 of the cylindrical can 320, wherein a bonding jig may be required.

In addition, the mold surface of the middle flange 322 and can 320 may be the inside surface so that the fit of the can 320 to the permanent magnets within the motor rotor is clean, and may not require an epoxy or glue, as it could be press fit.

The rear flange 330 to can 320 mating surface may be a simple rolled out surface that is molded both as part of the can/middle flange 320/322 and, as a matching surface on the rear flange 330, allowing the rear flange 330 to be accurately mounted. The rearwardly extending circular flange 332 of rear flange 330 may be used to locate a seal for sealing engagement with a stator (not shown). Therefore, all structure and wiring and cooling must route inside the diameter of the circular flange 332 on the motor. The carbon fiber rotor design described above advantageously provides a rotor with superior fatigue properties compared to the prior aluminum casting rotor design. In addition, the carbon fiber rotor design only weighs 800 grams, providing significant weight reduction advantages, particularly when considering AWT designs, where 8 or more such rotors may be used. As a result, a weight reduction of over 25 kilograms may be achieved using the carbon fiber rotor design described above.

While the above embodiments have been described in connection with the front flange, can or shell, and rear flange comprised of carbon fiber, in an alternate embodiment, those components may be made of spun aluminum. The spun aluminum components may be bonded or stir welded together, and a CNC bracket used for mounting to the driveshaft. When using either carbon fiber of aluminum components, the present design advantageously utilizes a hollow space to create a very strong structure out of sheet elements. Carbon fiber is one very appropriate material for such elements, and spun aluminum is also an appropriate material. While the fatigue strength of aluminum is not superior, the configuration allows enough efficiency in the layout of the structure to keep the loads very low. Both a carbon fiber design and a spun aluminum design provide lower weight advantages over an equivalent design using a cast aluminum rotor design.

4. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An airborne wind turbine system, comprising:
   an aerial vehicle having a main wing;
   an electrically conductive tether having a first end secured to the main wing of the aerial vehicle and a second end secured to a ground station;
   a plurality of power generating turbines connected to the main wing wherein at least one of the power generating turbines are operable in a power generation mode and in a thrust generation mode, and includes a propeller mounted to a rotor;
   wherein the rotor comprises:
   a front flange;
   a can;
   a rear flange; and
   a rigid insert comprising a propeller mount;
      wherein the front flange, can, and rear flange comprise one of carbon fiber and spun aluminum;
      wherein a rear end of the front flange is attached to a front end of the can, and the rear flange is mounted to a rear end of the can;
      wherein the rigid insert is bonded to the front flange;
      wherein the rigid insert comprises a tube that axially extends within the rotor to allow for the positioning of a driveshaft therethrough; and
      wherein the rotor has a front surface that is attached to a root of the propeller.

2. The airborne wind turbine system of claim 1, wherein a front surface of the front flange is shaped to conform to a shape of a rear surface of the root of the propeller.

3. The airborne wind turbine system of claim 1, wherein the rigid insert includes a nut plate for attachment to the root of the propeller.

4. The airborne wind turbine system of claim 3, wherein the front surface of the front flange includes divots around bolt holes in the nut plate to provide an out-of-plane shape to the front surface of the front flange.

5. The airborne wind turbine system of claim 4, wherein the tube is tapered downwardly as it extends towards the rear flange.

6. The airborne wind turbine system of claim 1, wherein a locating flange extends rearwardly from the rear flange for sealing engagement with a stator positioned on the main wing.

7. The airborne wind turbine system of claim 1, wherein the rigid insert comprises a metal.

8. The airborne wind turbine system of claim 1, wherein the rigid insert comprises carbon fiber.

9. The airborne wind turbine system of claim 1, wherein the front flange is mounted to the front end of the can by bonding to a middle flange extending forwardly from the front end of the can.

10. The airborne wind turbine system of claim 1, wherein the front flange has a conical shape as it tapers outwardly from a front surface of the front flange to a rear surface of the front flange.

11. The airborne wind turbine system of claim 5, wherein the driveshaft is bonded to or press fit to an inner surface of the can.

12. The airborne wind turbine system of claim 10, wherein the can has a cylindrical outer surface.

13. A rotor for use with an airborne wind turbine system wherein the rotor comprises:
   a front flange;
   a can;
   a rear flange; and
   a rigid insert comprising a propeller mount;
      wherein the front flange, can, and rear flange comprise one of carbon fiber and spun aluminum;
      wherein a rear end of the front flange is attached to a front end of the can, and the rear flange is mounted to a rear end of the can;
      wherein the rigid insert is bonded to the front flange;
      wherein the rigid insert comprises a tube that axially extends within the rotor to allow for the positioning of a driveshaft therethrough; and
      wherein the rotor has a front surface that is adapted for attachment to a root of a propeller.

14. The rotor of claim 13, wherein a front surface of the front flange is shaped to conform to a shape of a rear surface of the root of the propeller.

15. The rotor of claim 13, wherein the rigid insert includes a nut plate for attachment to the root of the propeller.

16. The rotor of claim 15, wherein the front surface of the front flange includes divots around bolt holes in the nut plate to provide an out-of-plane shape to the front surface of the front flange.

17. The rotor of claim 13, wherein the rotor is adapted to receive a driveshaft that is tapered downwardly towards the rear flange.

18. The rotor of claim 13, wherein a locating flange extends rearwardly from the rear flange for sealing engagement with a stator positioned on a main wing.

19. The rotor of claim 13, wherein the rigid insert comprises carbon fiber.

20. The rotor of claim 13, wherein the front flange is mounted to the front end of the can by bonding to a middle flange extending forwardly from the front end of the can.

21. The rotor of claim 13, wherein the front flange has a conical shape as it tapers outwardly from a front surface of the front flange to a rear surface of the front flange.

* * * * *